Sept. 15, 1959     D. E. COOPER ET AL     2,904,718
METHOD FOR CONTROLLING ARC LENGTH
Original Filed July 1, 1957
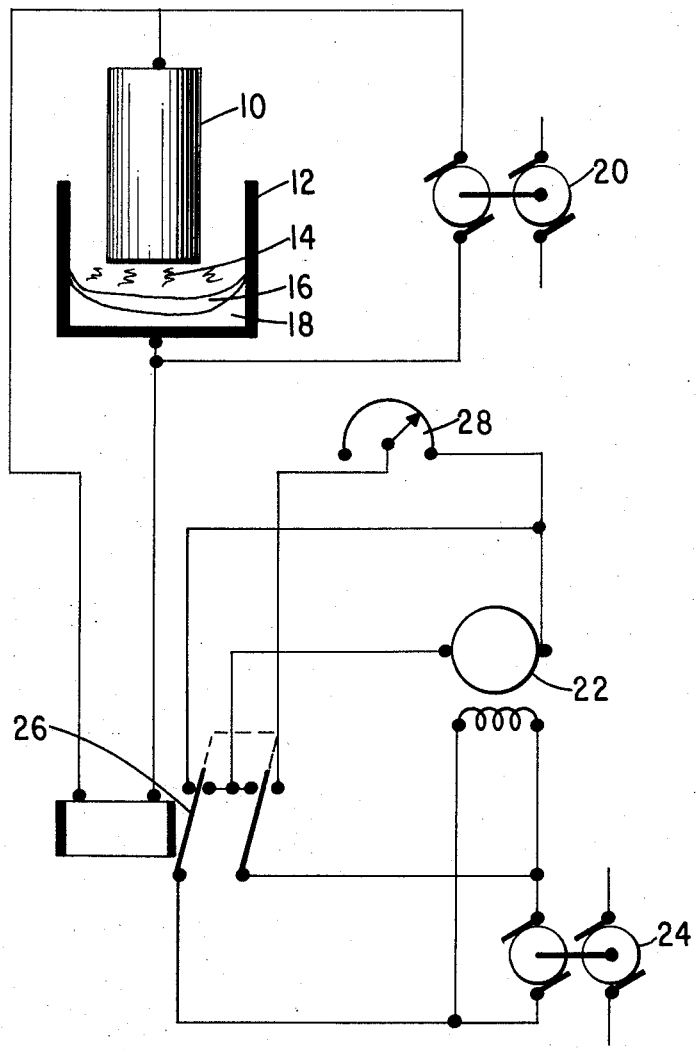
INVENTORS.
DONALD E. COOPER
ELMER D. DILLING
BY
Agent

United States Patent Office 2,904,718
Patented Sept. 15, 1959

2,904,718
METHOD FOR CONTROLLING ARC LENGTH

Donald E. Cooper and Elmer D. Dilling, Las Vegas, Nev., assignors to Titanium Metals Corporation of America, New York, N.Y., a corporation of Delaware Continuation of application Serial No. 609,026, July 1, 1957. This application June 5, 1958, Serial No. 740,121

3 Claims. (Cl. 314—73)

This invention relates to consumable electrode arc melting and more particularly to a method for controlling the travel of a consumable electrode during such melting.

Consumable electrode arc furnaces are often employed for melting refractory metals such as for example, titanium, zirconium, molybdenum and alloy steels. In general they comprise a cooled crucible and means for gradually lowering the electrode as the melting action of the arc transfers metal into the crucible to form an ingot. The electrode travel must be carefully controlled to maintain the desired melting conditions. Under some conditions an extremely short arc length is desirable, particularly in applications where there is a danger of a longer arc wandering to the crucible walls. Efforts to compensate for varying conditions to produce a reliable short arc control system have not heretofore met with practical success.

It is the principal object of this invention to provide a simple and efficient method for controlling electrode travel in a consumable electrode arc melting furnace. A further object is to provide a method for controlling electrode travel in such furnaces to maintain a short arc length. These and other objects of this invention will be apparent from the following detailed description thereof.

This invention in its broadest aspects contemplates a method for controlling the travel of a consumable electrode to provide a short arc between it and a molten pool of metal in a crucible which comprises, establishing an arc and passing electric current between said electrode and said molten pool, and then lowering said electrode toward said pool to contact the bottom of the electrode with the pool and short circuit and extinguish the arc. As soon as the arc is extinguished by contact of the bottom of the electrode with the molten pool, the electrode is raised away from the pool until the electrode and the molten pool are spaced apart and the arc is re-established. When this occurs the electrode is lowered again at a rate greater than the difference between the rate at which the electrode is being linearly consumed and the rate of rise of the level of metal in the crucible. Preferably the rate of electrode lowering is only slightly greater than the difference between the electrode consumption rate and the metal rise rate and in any event should not exceed three times this difference. If the melting operation is not completed before the arc is short circuited by contact again between the bottom of the electrode and the pool of molten metal then the cycle of raising the electrode until the arc is re-established, followed by re-lowering of the electrode as above described, is repeated.

The control of electrode travel according to this invention may be accomplished manually; however, for economy and efficiency automatic apparatus may be used. Although any suitable kind of apparatus may be employed, and many will be obvious to those skilled in the art, a convenient and advantageous organization is illustrated in the single figure of the drawing.

Referring to the drawing in detail, an electrode in a consumable electrode arc furnace is represented at 10 and crucible into which the electrode is melted at 12. Play of the arc 14 will transfer metal from the electrode 10 to first form a molten pool 16 and which on progressive freezing produces a solid ingot as at 18. A suitable source of electric power such as motor generator 20 is connected to the consumable electrode 10 and to the crucible 12 to provide electric current for the arc 14.

Means are provided for producing travel of the consumable electrode 10, which in the embodiment illustrated comprise a direct current drive motor 22 acting through a suitable and conventional mechanical organization to raise or lower the electrode 10 with respect to the molten pool 16, thereby to tend to lengthen or shorten the length of the arc 14. An electric current supply for motor 22 may comprise motor generator 24.

The current supply 24 is adjustably connected to drive motor 22 in order to control the direction of rotation thereof which in turn will control the direction of travel of electrode 10. This may be accomplished by connecting the field windings of motor 22 directly to motor generator 24, as shown, and by employing means for reversing the connection of the current supply 24 to the armature of motor 22 to reverse the polarity of the current supplied to this element thereof. Such means may comprise a double pole relay 26 whose solenoid actuating element is connected through a feed back circuit to the electrode 10 and the crucible 12 in order to make action of the relay 26 responsive to the voltage of current flowing between the electrode 10 and the molten pool 16. The circuit illustrated is arranged so that when an arc 14 is maintained between electrode 10 and the molten pool 16 the arc voltage applied to the solenoid of the relay 26 will maintain the contact elements of the relay in position to connect the current supply 24 to the armature of the motor 22 to provide a rotation of motor 22 in such direction as to produce a direction of travel of electrode 10 tending to lower the electrode and decrease the length of the arc 14. When the electrode 10 is lowered to an extent that it contacts the molten pool 16 in the crucible 12, and the arc is thereby short-circuited and extinguished, a comparatively much lower voltage will be impressed on the solenoid of relay 26 and the contact elements thereof will snap over to reverse the polarity of the current applied to the armature of motor 22 as will be clear from the drawing. On reversal of the polarity of the current to the armature of motor 22, the direction of travel of electrode 10 is thereby also reversed and it starts to rise until spacing is obtained and the arc is re-established. As soon as this occurs, a higher voltage is again impressed on the solenoid of relay 26 which returns the contact elements to their previous position so that the polarity of the current supply to drive motor 22 is again reversed and electrode 10 travels downward in a direction tending to shorten the length of arc 14.

Means for regulating the rate of downward travel of electrode 10 should be provided and such may, if desired, be arranged in the mechanical transmission between drive motor 22 and electrode 10. Preferably, however, the regulating means is incorporated in the control circuit and may conveniently comprise a variable resistor such as rheostat 28 in one of the connecting lines providing current to the armature of the motor 22. It is desirable that the rate of downward travel of the electrode 10, which tends to decrease the length of the arc 14, be relatively slow, but it is essential that this rate be greater than the difference between the rate at which electrode 10 is being linearly consumed, that is, shortened by its consumption and transfer into the molten pool, and the rate at which the metal level in crucible 12 is rising. The rate of downward travel of the electrode being greater than the difference between the rate of electrode linear consumption and the rate of rise of metal in the crucible insures a gradually decreasing arc length until short-circuiting again occurs. Preferably, to provide a reasonable and efficient cycle without an excessive number of short circuit interruptions, the downward travel rate should not be more than three times the difference between the rate of linear electrode consumption and the metal rise rate.

The process of this invention is illustrated by the following example.

*Example 1*

A conventional consumable electrode arc melting furnace was employed with an electrode travel control circuit of the type illustrated in the drawing. The consumable electrode was fabricated of compressed titanium sponge and was of octagonal cross section 4 inches in diameter. The crucible into which this electrode was melted was water cooled and of 8 inches internal diameter. A small amount of titanium sponge was placed in the bottom of the crucible as starting metal.

A D.C. generator supplying electric current of 3,000 amperes at about 35 volts was connected by intermediate means across the electrode and to the crucible which in turn connected this side of the current supply to metal in the crucible. With the electrode in place the furnace was sealed, evacuated and power to electrode and crucible turned on. The electrode was then lowered by adjustment of the rheostat in the control circuit until an arc was established between the electrode and metal in the crucible. This started consumption of the electrode and formed a pool of molten metal from the electrode in the crucible. The electrode was lowered toward the pool of molten metal until the bottom of the electrode contacted the pool and short-circuited and extinguished the arc. When this occurred the relay in the control system snapped over, reversed the electrode control drive motor and raised the electrode until the bottom of the electrode and the pool of molten metal were spaced apart and the arc was re-established. Thereupon the relay snapped back to again reverse the drive motor to lower the electrode. The rheostat in the control circuit was now carefully adjusted to provide a rate of lowering of the electrode slightly greater than the difference between the rate of linear consumption of the electrode and the rate of rise of metal in the crucible. At 3,000 amperes the electrode was being consumed and transferred into the crucible at a rate of 2.36 inches per minute. The transferred metal was rising in the crucible at a rate of 0.42 inch per minute. The rate of lowering of the electrode was set at a rate greater than the 1.94 inches difference between these two rates and in this instance was set at 3.54 inches per minute. This rate of lowering the electrode was 1.8 times the difference between the rate of linear consumption of the electrode and the rate of rise of metal in the crucible. This setting resulted in a short circuit approximately once a minute with lowering intervals between short circuits characterized by smooth arc melting conditions. The average greatest length of arc was 1.6 inches and since this was gradually decreased to nothing when short circuit occurred the over-all average arc length was less than one inch. No arcing from the electrode to the crucible wall occurred during the melting operation.

At the end of 14 minutes melting under conditions described above the operation was shut down and after a cooling period, a well melted titanium ingot weighing 45 pounds was removed from the crucible.

The method of this invention employs, as will be obvious, the pool of molten metal as a reference for arc length. Methods heretofore employed, using arc voltage as a control reference, suffer from the disadvantage that as the electrode becomes consumed its length shortens and its resistance changes. Therefore voltage measurements taken on the power input to the top of the electrode (the only convenient method) and the crucible include the voltage drop across the varying length and resistance of the electrode. It is difficult under these conditions to provide accurate automatic control.

It might appear that short circuiting of the arc would be disadvantageous in an arc melting process of the type described. However, it has been found that the intentional short circuiting according to this invention is not harmful to the melting process or equipment and the benefits of positive control and a short arc more than offset the extremely short periods of time that the arc is extinguished.

The control method of this invention depends on periodic short-circuiting and extinguishing of the arc followed by alternate periods of gradual lowering of the electrode while maintaining a short arc length. Excessively frequent short-circuits and therefore very short and numerous periods of effective arcing, which would seriously limit the production capacity of the melting furnace, do not occur, as might be surmised, due to an interesting phenomenon which occurs in the molten pool during the melting part of the cycle. During play of an arc between the electrode and the metal in the crucible, the molten pool appears to be repelled and the surface thereof assumes a concave, dish-shaped form substantially as shown at 16 in the drawing. When the arc is extinguished by short-circuit the forces responsible for this dish-shaped surface are no longer present, and the molten pool assumes a normally relatively level top surface. Therefore, when the arc is short-circuited, the top of the molten pool immediately levels out until the electrode is withdrawn a sufficient distance so that the pool and the electrode are spaced apart and the arc is re-established. When this occurs, the concave molten pool surface is reformed and provides additional distance between the bottom end of electrode 10 and the molten pool surface so that if the rate of downward travel of electrode 10 is suitably regulated, a relatively long period of smooth, short-arc melting may be obtained. In effect, the method of this invention makes possible a short arc of minimum length which is at its longest only slightly longer than the distance between the surface of the molten pool when level and when forced into a concave surface by play of the arc thereon. The advantages of operation at an advantageously short arc length are therefore obtained.

The method of this invention is useful for providing a short arc in consumable electrode arc melting processes. A short arc has less tendency to wander, maintains more concentrated heat and tends to eliminate arcing between the electrode to the crucible side walls.

This application is a continuation of our application Serial No. 669,026, filed July 1, 1957 and now abandoned.

We claim:

1. A method for controlling the travel of a consumable metallic electrode to maintain a short arc between said electrode and a pool of molten metal from said electrode in a crucible which comprises; passing electric current and establishing an arc between said electrode and metal in said crucible, thereby to form a pool of molten metal from said electrode in said crucible, lowering said electrode until the bottom of said electrode contacts the pool of molten metal, thereby short-circuiting and extinguishing said arc, thereupon raising said electrode until the bottom of said electrode is spaced apart from said pool of molten metal and said arc is re-established, and thereupon lowering said electrode at a rate greater than the difference between the rate of linear consumption of said electrode and the rate at which said molten metal rises by transfer of metal from said electrode into said crucible.

2. A method for controlling the travel of a consumable metallic electrode to maintain a short arc between said electrode and a pool of molten metal from said electrode in a crucible which comprises; passing electric current and establishing an arc between said electrode and metal in said crucible, thereby to form a pool of molten metal from said electrode in said crucible, lowering said electrode until the bottom of said electrode contacts the pool of molten metal, thereby short-circuiting and extinguishing said arc, (a) thereupon raising said electrode until the bottom of said electrode is spaced apart from said pool of molten metal and said arc is re-established, (b) thereupon lowering said electrode at a rate greater than the difference between the rate of linear consumption of said electrode and the rate at which said molten metal rises by transfer of metal from said electrode into said crucible, and repeating the cycle of steps (a) and (b).

3. A method for controlling the travel of a consumable metallic electrode to maintain a short arc between said electrode and a pool of molten metal from said electrode in a crucible which comprises; passing electric current and establishing an arc between said electrode and metal in said crucible, thereby to form a pool of molten metal from said electrode in said crucible, lowering said electrode until the bottom of said electrode contacts the pool of molten metal, thereby short-circuiting and extinguishing said arc, thereupon raising said electrode until the bottom of said electrode is spaced apart from said pool of molten metal and said arc is re-established and thereupon lowering said electrode at a rate greater than and up to three times the difference between the rate of linear consumption of said electrode and the rate at which said molten metal rises by transfer of metal from said electrode into said crucible.

References Cited in the file of this patent

UNITED STATES PATENTS

| | | |
|---|---|---|
| 1,271,475 | Kiefer | July 2, 1918 |
| 1,310,109 | Winne | July 15, 1919 |
| 1,449,879 | Boddie | Mar. 27, 1923 |
| 1,539,885 | Thompson | June 2, 1925 |
| 2,634,920 | Shaffer | Dec. 12, 1944 |
| 2,686,824 | Evans et al. | Aug. 17, 1954 |
| 2,798,107 | Boron et al. | July 2, 1957 |